United States Patent
Varshney et al.

(10) Patent No.: US 12,273,377 B2
(45) Date of Patent: Apr. 8, 2025

(54) SYSTEMS AND METHODS FOR DETECTING MALWARE ATTACKS

(71) Applicant: NetApp Inc., San Jose, CA (US)

(72) Inventors: Prateeksha Varshney, Bangalore (IN); Siddhartha Nandi, Bangalore (IN); Jayanta Basak, Bangalore (IN)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 18/477,879

(22) Filed: Sep. 29, 2023

(65) Prior Publication Data

US 2024/0022597 A1   Jan. 18, 2024

Related U.S. Application Data

(63) Continuation of application No. 17/062,732, filed on Oct. 5, 2020, now Pat. No. 11,792,223.

(30) Foreign Application Priority Data

Jun. 29, 2020   (IN) .............................. 202041027588

(51) Int. Cl.
*H04L 9/40* (2022.01)
*G06F 21/60* (2013.01)

(52) U.S. Cl.
CPC .......... *H04L 63/145* (2013.01); *G06F 21/602* (2013.01); *H04L 63/1416* (2013.01)

(58) Field of Classification Search
CPC . G06F 21/566; G06F 21/602; H04L 63/1416; H04L 63/145
See application file for complete search history.

(56) References Cited

U.S. PATENT DOCUMENTS

| | | |
|---|---|---|
| 10,121,003 B1 | 11/2018 | Adams |
| 10,469,525 B2 | 11/2019 | Hittel et al. |
| 10,503,897 B1 | 12/2019 | Striem-Amit |
| 10,715,533 B2 | 7/2020 | Iwanir et al. |
| 11,082,441 B1 | 8/2021 | Bouguerra et al. |
| 2018/0048658 A1* | 2/2018 | Hittel ..................... G06F 21/565 |
| 2019/0026466 A1* | 1/2019 | Krasser ................... G06N 7/01 |
| 2019/0130097 A1* | 5/2019 | Berler ................... G06F 21/552 |
| 2019/0347415 A1 | 11/2019 | Yavo et al. |

(Continued)

OTHER PUBLICATIONS

Notice of Allowance mailed Jun. 14, 2023 for U.S. Appl. No. 17/062,732, filed Oct. 5, 2020, 4 pages.

(Continued)

*Primary Examiner* — Olugbenga O Idowu
(74) *Attorney, Agent, or Firm* — HAYNES AND BOONE, LLP

(57) ABSTRACT

A method, a computing device, and a non-transitory machine-readable medium for detecting malware attacks. In one example, an agent implemented in an operating system detects an overwrite in which an original data component is overwritten with a new data component. The agent computes a plurality of features associated with the overwrite, the plurality of features including an original entropy corresponding to the original data component, a new entropy corresponding to the new data component, an overwrite fraction, and a set of divergence features. The agent determines whether the new data component is encrypted using the plurality of features.

20 Claims, 6 Drawing Sheets

(56) References Cited

U.S. PATENT DOCUMENTS

| | | |
|---|---|---|
| 2020/0380129 A1 | 12/2020 | Dawson et al. |
| 2021/0409425 A1 | 12/2021 | Varshney et al. |
| 2022/0038477 A1 | 2/2022 | Farrahi Moghaddam et al. |

OTHER PUBLICATIONS

Notice of Allowance mailed on May 26, 2023 for U.S. Appl. No. 17/062,732, filed Oct. 5, 2020, 7 pages.

* cited by examiner

SYSTEMS AND METHODS FOR DETECTING MALWARE ATTACKS

CROSS REFERENCE TO RELATED APPLICATIONS

The present application is a continuation application of U.S. patent application Ser. No. 17/062,732, filed Oct. 5, 2020, which claims priority to Indian Patent Application No. 202041027588 filed Jun. 29, 2020, the disclosures of which are incorporated herein by reference in their entireties.

TECHNICAL FIELD

The present description relates to data security, and more specifically, to systems and methods for distinguishing between normal data overwriting and malware-associated encrypted overwriting.

BACKGROUND

Malicious software (malware) may be any software designed to cause damage to a computer, server, client, or computer network. There are a variety of different types of malware including, for example, but not limited to, computer viruses, worms, ransomware, spyware, Trojan horses, and adware. Ransomware is a type of malware that threatens to publish or otherwise make publicly available a victim's data or blocks access to that data unless or until a ransom is paid. The victim may be an individual person, an organization, a business enterprise, or some other type of entity.

In a typical scenario, ransomware encrypts the data in one or more files on a computer or server and prompts a user to pay the ransom amount to be able to decrypt or retrieve the user's data. Oftentimes, the encrypted data is stored in a new file with the encryption key being stored on a different server from the encrypted files and the original file being deleted. In some cases, the original file is overwritten with the encrypted data. Further, ransomware may also make it difficult to preserve snapshots of the original data (the data prior to encryption by the malware). For example, certain recycle settings may cause an older snapshot (e.g., a previously generated snapshot) to be deleted when a newer one is generated so that the overall number of snapshots being maintained is constant or maintained below a threshold. Some ransomware may be configured to run slowly over several days, weeks, or even months to ensure that any snapshots with the original data are deleted. Because a ransomware attack can result in significant data loss and monetary loss, it is important to be able to detect such attacks and mitigate losses.

BRIEF DESCRIPTION OF THE DRAWINGS

The present disclosure is best understood from the following detailed description when read with the accompanying figures.

DETAILED DESCRIPTION

Figure 1:
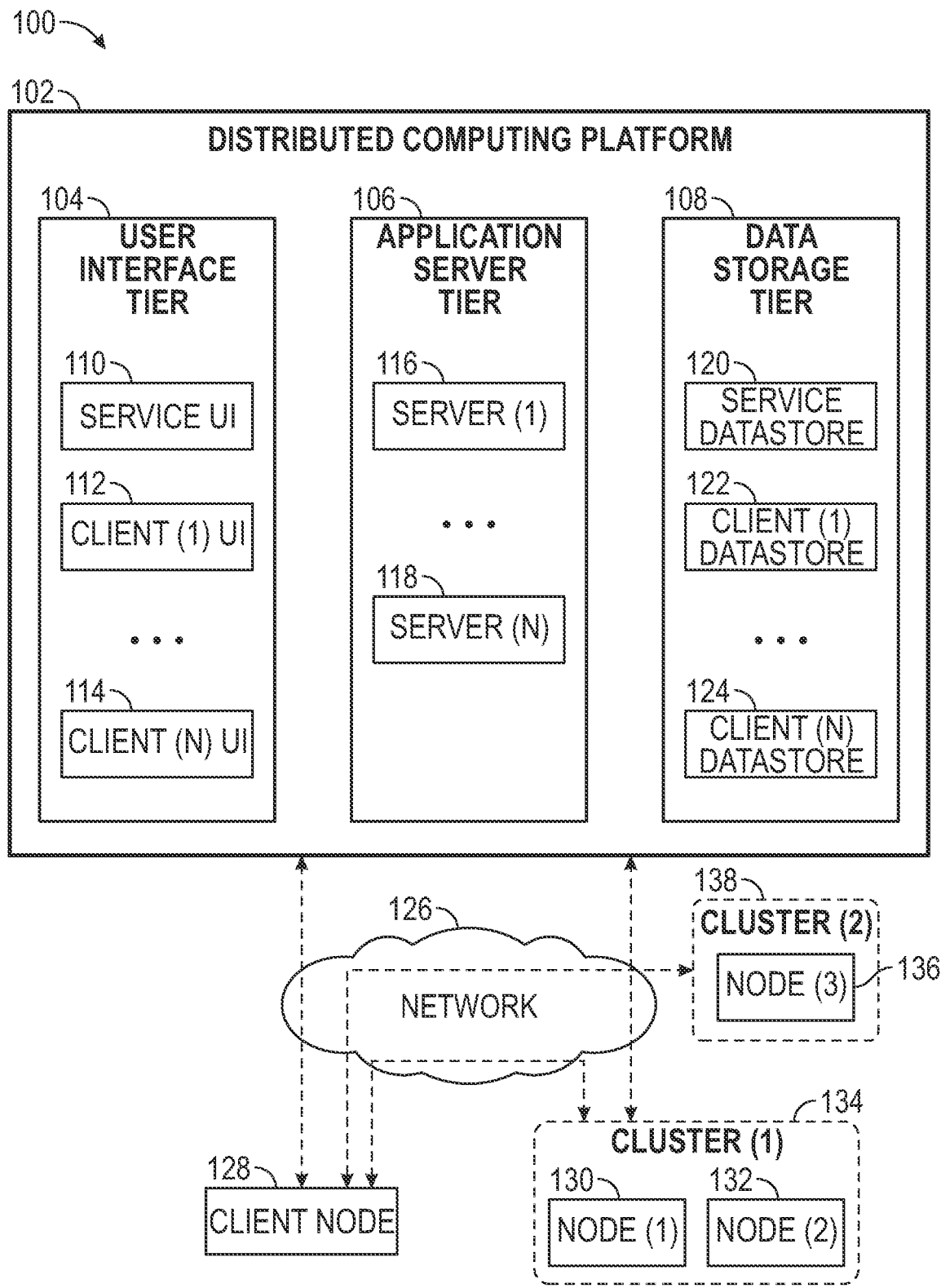
FIG. 1 is a block diagram illustrating a computing environment in accordance with one or more example embodiments.

All examples and illustrative references are non-limiting and should not be used to limit the claims to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

Various embodiments include methods, systems, and machine-readable media for distinguishing between data overwrites that are normal and data overwrites that are due to malware attacks (e.g., ransomware attacks) and mitigating data loss. In one or more embodiments, an agent, which may be referred to as a malware detection agent or simply a detection agent, is used to analyze data overwrites based on a plurality of features computed based on the original data component and the new data component written over the original data component. The embodiments described herein enable malware to be detected even when weaker forms of encryption are used by the malware. For example, certain types of malware may use weaker forms of encryption that preserve the byte frequency distribution of files. By preserving the byte frequency distribution of files, these types of malware may be able to evade detection by avoiding being caught by statistical indicators using, for example, the chi-square test. The embodiments described herein enables encrypted data generated by malware to be detected regardless of whether strong or weak encryption was used for the encryption. In a particular example, Shannon entropies and Kullback-Leibler divergences may be used to detect encrypted data. Once encrypted data has been detected and a malware attack confirmed, one or more mitigation actions may be initiated.

Thus, the methods, systems, and machine-readable media described herein enable early detection of malware attacks, such as ransomware attacks, as well as data loss mitigation via special snapshot creation and/or notification of the detected malware attacks.

FIG. 1 is a diagram illustrating a computing environment 100 in accordance with one or more example embodiments. In one example, the techniques described herein may include actions implemented within a client node 128, which may take the form of, for example, a laptop, a tablet, a personal computer, a mobile device, a server, a virtual machine, a wearable device, or some other type of client device. In another example, the techniques described herein may include actions implemented within one or more nodes, such as a first node 130 and/or a second node 132 within a first cluster 134, a third node 136 within a second cluster 138, or some other combination of nodes (such as discussed with respect to FIG. 3 in which a malware detection agent runs within an operating system of a storage node). A node may comprise a storage controller, a server, an on-premise device, a virtual machine such as a storage virtual machine, hardware, software, or combination thereof. The one or more nodes may be configured to manage the storage and access to data on behalf of the client node 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein include actions implemented across one or more of the client node 128, the one or more nodes 130, 132, and/or 136, and/or the distributed computing platform 102. For example, the client node 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein include actions implemented by a storage operating system or are implemented by a separate module that interacts with the storage operating system. The storage operating system may be hosted by the client node 128, the distributed computing platform 102, or across a combination thereof. In an example, the storage operating system may execute within a storage virtual machine, a hyperscaler, or some other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write-anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks, and Modes are used to identify files and file attributes such as creation time, access permissions, size and block location, etc.).

In an example, deduplication may be implemented by a deduplication module associated with the storage operating system to improve storage efficiency. For example, inline deduplication may ensure blocks are deduplicated before being written to a storage device. Inline deduplication uses a data structure, such as an in-core hash store, which maps fingerprints of data-to-data blocks of the storage device storing the data. Whenever data is to be written to the storage device, a fingerprint of that data is calculated, and the data structure is looked up using the fingerprint to find duplicates (e.g., potentially duplicate data already stored within the storage device). If duplicate data is found, then the duplicate data is loaded from the storage device and a byte-by-byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the computing environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client node 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client node 128 for the write operation until the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the computing environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120. Further, the data storage tier 108 may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, logical unit numbers (LUNs), or other logical organizations of data that can be defined across one or more physical storage devices. In another example, the first node 130 transmits and stores all client data to the distributed computing platform 102. In yet another example, the client node 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client node 128, within the first node 130, or within the distributed computing platform 102 such as by the application server tier 106. In another example, one or more SVMs may be hosted across one or more of the client node 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client node 128 and/or the first node 130 over the network 126. The SVM executes a storage application and/or an instance of the storage operating system to process the operations and/or store the data within the client (1) data store 122. The SVM may transmit a response back to the client node 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client node 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client node 128 and/or the first node 130 may subscribe to certain types and amounts of services and resources provided by the distributed computing platform 102. For example, the client node 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client node 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
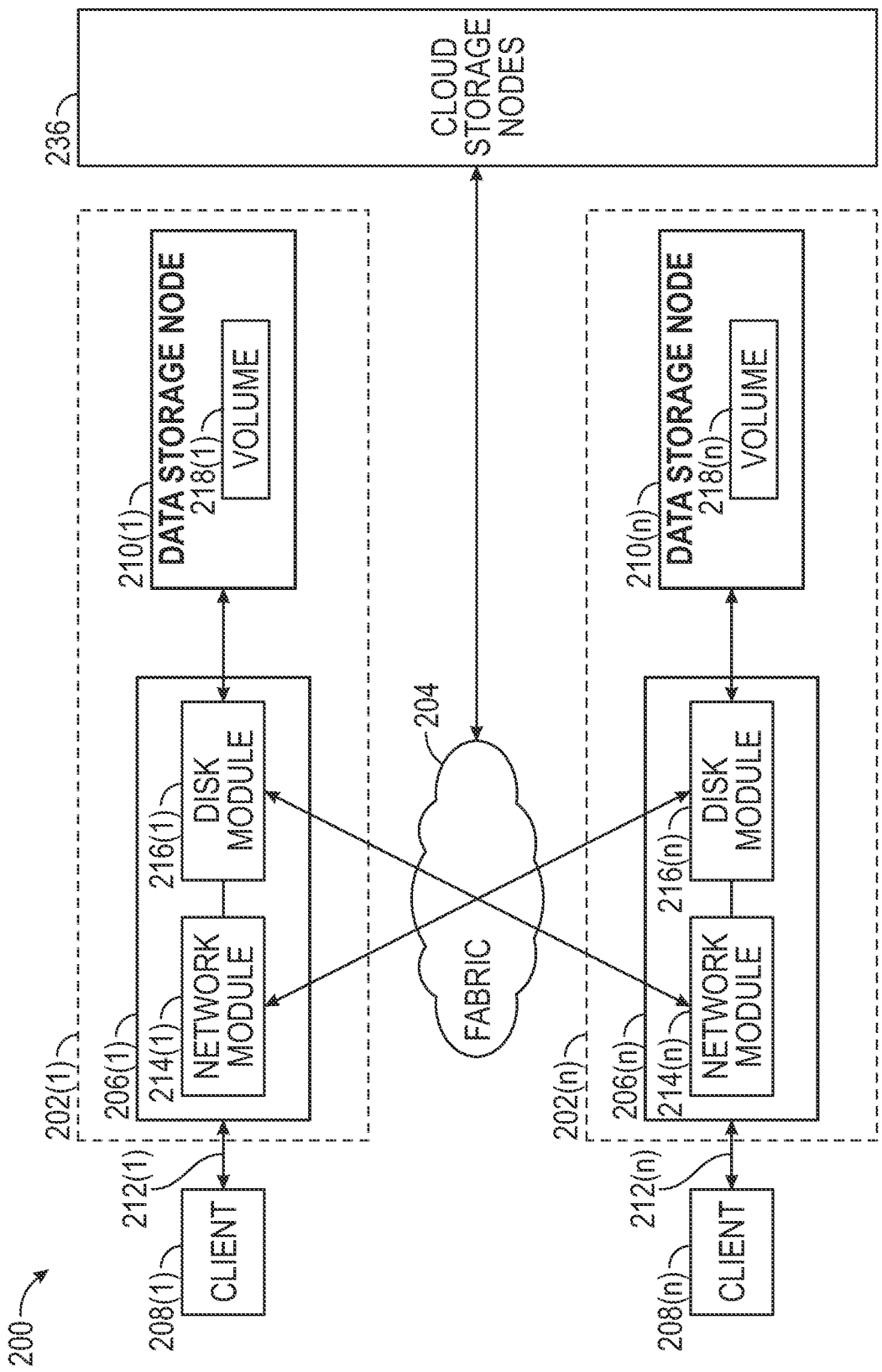
FIG. 2 is a block diagram illustrating a network environment with exemplary node computing devices in accordance with one or more example embodiments.

FIG. 2 is a block diagram illustrating a network environment 200 in accordance with one or more example embodiments. The network environment 200 illustrates another architecture for the principles described above with respect to FIG. 1. Furthermore, the techniques described herein may be implemented with use of a malware detection agent (such as described with respect to FIG. 3) running in an operating system of a storage node, such as any single or multiple ones of the data storage apparatuses 202(1)-202(n) of FIG. 2.

The network environment 200, which may take the form of a clustered network environment, includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n) (also referred to as node computing devices), for example), although any number of other elements or components can also be included in the network environment 200 in other examples. This technology provides a number of advantages including methods, non-transitory computer-readable media, and computing devices that implement the techniques described herein.

In this example, node computing devices 206(1)-206(n) can be primary or local storage controllers or secondary or remote storage controllers that provide client devices 208(1)-208(n) (also referred to as client nodes) with access to data stored within data storage nodes 210(1)-210(n) (also referred to as data storage devices) and cloud storage node(s) 236 (also referred to as cloud storage device(s)). The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202 (1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage nodes 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage node(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 208(n) with switchover data access to data storage nodes 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the network connections 212(1)-212(n), for example, allowing the client devices 208(1)-208(n) to access data stored in the network environment 200.

Further, the network modules 214(1)-214(n) can provide connections with one or more other components through the cluster fabric 204. For example, the network module 214(1) of node computing device 206(1) can access the data storage node 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage node 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage nodes 210(1)-210(n), such as disks or arrays of disks, SSDs, flash memory, or some other form of data storage, to the node computing devices 206(1)-206(n). Often, disk modules 216(1)-216(n) communicate with the data storage nodes 210(1)-210(n) according to the SAN protocol, such as SCSI or FCP, for example, although other protocols can also be used. Thus, as seen from an operating system on node computing devices 206(1)-206(n), the data storage nodes 210(1)-210(n) can appear as locally attached. In this manner, different node computing devices 206(1)-206(n), etc. may access data blocks, files, or objects through the operating system, rather than expressly requesting abstract files.

While the network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the network connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-

214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage nodes 210(1)-210(n), for example. One or more of the data storage nodes 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage nodes 210(1)-210(n) and one or more of the cloud storage node(s) 236 to provide tiered storage, for example, and other arrangements can also be used in other examples.

In one example, to facilitate access to data stored on the disks or other structures of the data storage nodes 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage nodes 210(1)-210(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more LUNs, directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage nodes 210(1)-210(n) can have one or more physical ports, wherein each physical port can be assigned a target address (e.g., SCSI target address). To represent respective volumes, a target address on the data storage nodes 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
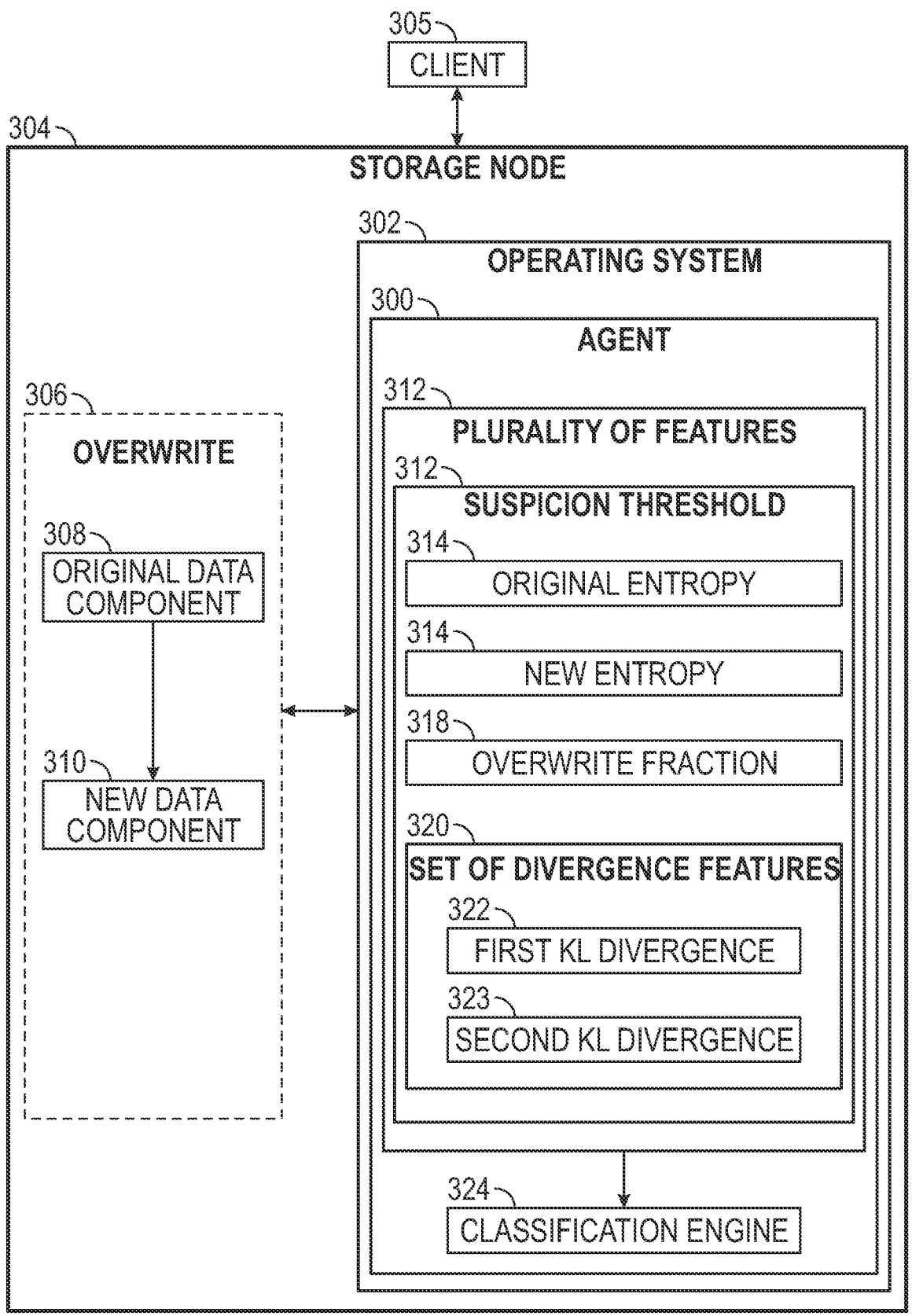
FIG. 3 is a block diagram illustrating an agent implemented in accordance with one or more example embodiments.

FIG. 3 is a block diagram illustrating an agent 300 in accordance with one or more example embodiments. The agent 300 may also be referred to as a detection agent or a malware detection agent. In one or more examples, the agent 300 is implemented in an operating system 302 of one or more exemplary nodes. The operating system 302 is a storage operating system that may be hosted by a distributed computing platform such as, for example, distributed computing platform 102 in FIG. 1, or may be installed in one or more data storage apparatuses, such as data storage apparatuses 202(1)-202(n). For example, the operating system 302 may be installed in memory that resides within one or more of the node computing devices 206(1)-206(n), one or more of the data storage nodes 210(1)-210(n), the cloud storage node(s) 236, or a combination thereof.

In one or more examples, the operating system 302 is installed on a storage node 304. The storage node 304 may take the form of, for example, the data storage tier 108 in FIG. 1, one of the data stores in the data storage tier 108 in FIG. 1, one or more of the data storage apparatuses 202(1)-202(b), one of the data storage nodes 210(1)-210(n), one of the cloud storage node(s) 236, or some other type of data storage.

In one or more examples, the storage node 304 takes the form of an external storage array. In these examples, a client, such as a client 305, may communicate, via one or more intermediaries (e.g., one or more web services, one or more node computing devices such as one or more of the node computing devices 206(1)-206(n), etc.), with the storage node 304 to create, delete, rename, or otherwise modify files that are stored in the storage node 304. Although the agent 300 is described herein as being implemented within the operating system 302, the agent 300 may be implemented within some other portion of the storage node 304 in other examples.

The agent 300 monitors data modification activity to detect when a malware attack is underway. In one or more examples, the agent 300 monitors data writes to determine whether a malware attack is causing data to be overwritten with encrypted data. An overwrite occurs when an original data component is overwritten with a new data component. A data component, as used herein, may refer to a file, a data block, or some other unit of data.

A malware attack such as, for example, a ransomware attack, may attack a group of files (e.g., 10 files, 50 files, 100 files, 1000 files, 10,000 files, 100,000 files, etc.). For a particular file stored on the storage node 304, for example, a malware attack may attempt to retrieve the file, encrypt data in that file, and write the encrypted data to a new encrypted file on the storage node 304. In many cases, the original file is deleted such that the original file is effectively overwritten or "replaced" with the new encrypted file. The agent 300 works to provide early detection of such a malware attack.

In particular, the agent 300 detects when an overwrite, such as overwrite 306, occurs. The overwrite 306 causes an original data component 308, which may be a file, a data block, or some other unit of data, to be overwritten or "replaced" with a new data component 310. When this overwrite 306 is caused by a malware attack, the effect may be an encryption of the original data component 308, with the new data component 310 being encrypted data that replaces the original data component 308. Thus, the new data component 310 being encrypted is an indicator that a malware attack (e.g., ransomware attack) is potentially underway.

For each overwrite 306 that is detected, the agent 300 computes a plurality of features 312 for that overwrite 306. The plurality of features 312 is used to determine whether the new data component 310 is encrypted. In the various embodiments, the plurality of features 312 includes, an original entropy 314 corresponding to the original data component 308, a new entropy 316 corresponding to the new data component 310, an overwrite fraction 318, and a set of divergence features 320 corresponding to both the original data component 308 and the new data component 310. The set of divergence features 320 includes at least one divergence feature. In one or more examples, the set of divergence features 320 includes five divergence features such that the plurality of features 312 includes a total of eight features.

The original entropy 314 is an indicator of the uncertainty or randomness of data within the original data component 308. Similarly, the new entropy 316 is an indicator of the uncertainty or randomness of data within the new data component 310. In one or more examples, the original entropy 314 and the new entropy 316 are computed as Shannon entropies. The Shannon entropy, e, for a data component may be computed as follows:

$$e = \sum_{i=0}^{255} P_{B_i} \log_2 \frac{1}{P_{B_i}}, \qquad (1)$$

where $$P_{B_i} = \frac{F_i}{totalbytes}, \qquad (2)$$

and
where totalbytes is the number of bytes in the particular data component and $F_i$, is the frequency of a particular byte, $B_i$. A particular byte $B_i$ may be a particular string of eight binary digits that represents any one of 256 characters (e.g., a litter, a number, a typographic symbol, etc.). The value of the entropy, e, may be between about 0 to about 8. A data component that contains encrypted data contains random data and will have a value close to about 8.

The overwrite fraction 318 is the fraction, or percentage, of the data component that is overwritten. In other words, the overwrite fraction 318 is the fraction or percentage of bytes of the data component that have been overwritten or "replaced" with respect to the total number of bytes in that data component, totalbytes.

The set of divergence features 320 may include one or more divergence features based on a first Kullback-Leibler (KL) divergence 322 and a second KL divergence 323. KL divergence, which is also referred to as "relative entropy," measures how one probability distribution differs from a second probability distribution. The first KL divergence 322 is from the new data component 310, which is denoted with Q or Q(x), to the original data component 308, which is denoted with P or P(x) is $D_{KL}(P\|Q)$. The second KL divergence 323 is from the original data component 308 to the new data component 310 is $D_{KL}(Q\|P)$. As one example, the first KL divergence 322, $D_{KL}(P\|Q)$, from the new data component 310 to the original data component 308 is computed as follows:

$$D_{KL}(P\|Q) = \sum_{x \in X} P(x) \log\left(\frac{P(x)}{Q(x)}\right). \qquad (3)$$

In one or more examples, the set of divergence features 320 includes various mathematical combinations of one or more of the overwrite fraction 318, the original entropy 314, the new entropy 316, the first KL divergence 322, and the second KL divergence 323. In one example embodiment, the set of divergence features 320 includes the following five divergence features:

$$D_{KL}(P\|Q)/\lambda, \qquad (4)$$

$$D_{KL}(Q\|P)/\lambda, \qquad (5)$$

$$(D_{KL}(P\|Q)+D_{KL}(Q\|P))/\lambda, \qquad (6)$$

$$(D_{KL}(P\|Q)+D_{KL}(Q\|P))*|(e(P)+e(Q)|/\lambda, \text{ and} \qquad (7)$$

$$(D_{KL}(P\|Q)+D_{KL}(Q\|P))*|e(Q)-e(P)|/\lambda, \qquad (8)$$

where $\lambda$ is the overwrite fraction 318, e(P) is the original entropy 314, and e(Q) is the new entropy 316.

The agent 300 computes the plurality of features 312 and inputs the plurality of features 312 into a classification engine 324. In these examples, the classification engine 324 is integrated as part of the agent 300. In other examples, however, the classification engine 324 is separate from the agent 300 but also implemented within the operating system 302. The classification engine 324 may include, for example, a linear Support Vector Machine (LSVM) that has been trained to use the plurality of features 312 to determine whether the new data component 310 is an encrypted data component or a "benign" data component (e.g., a normal overwrite). An LSVM is a supervised machine learning algorithm capable of performing classification and regression. An LSVM works by drawing a straight line between two classes (e.g., encrypted and benign) of data points such that all the data points that fall on one side of the line are labeled as belonging to a first class, while all the data points that fall on the other side of the line are labeled as belonging to a second class. Training an LSVM is described in more detail at FIG. 6. Although the various embodiments are described herein as using an LSVM, the classification engine 324 may be implemented using any number of algorithms, computational flows, pattern classifiers, or combination thereof. In some embodiments, the classification engine 324 may be implemented using artificial intelligence learning algorithms, neural network processing, or some other type of classification processing.

A classification of "encrypted" by the classification engine 324 indicates that the overwrite 306 that resulted in the new data component 310 is potentially associated with a malware risk. In other words, the overwrite 306 is potentially a malware-based overwrite.

If the classification engine 324 determines that the new data component 310 is encrypted, the agent 300 may implement one or more mitigation actions. The agent 300 may halt any further write operations until a determination can be made as to whether the overwrite 306 is indeed due to a malware attack. In one or more examples, the agent 300 flags the new data component 310 to prevent the new data component 310 from being written to disk. The agent 300 analyzes the new data component 310 while the new data component 310 is still in temporary memory and may prevent the new data component 310 from being written to disk if the new data component 310 is flagged as encrypted. In some examples, the agent 300 restores the copy of the original data component 308. The agent 300 may perform any combination of mitigation actions.

Thus, the agent 300 enables a malware attack to be quickly and easily detected while also allowing for mitigation of data loss. In one or more examples, the agent 300 works at the level of the operating system 302 to ensure that a malware attack does not escape detection and is tracked at the lowest level of the data write path. Such features may improve operation of a computer (e.g., storage node 304) by increasing data integrity, which may improve the operational availability of the computer.

Figure 4:
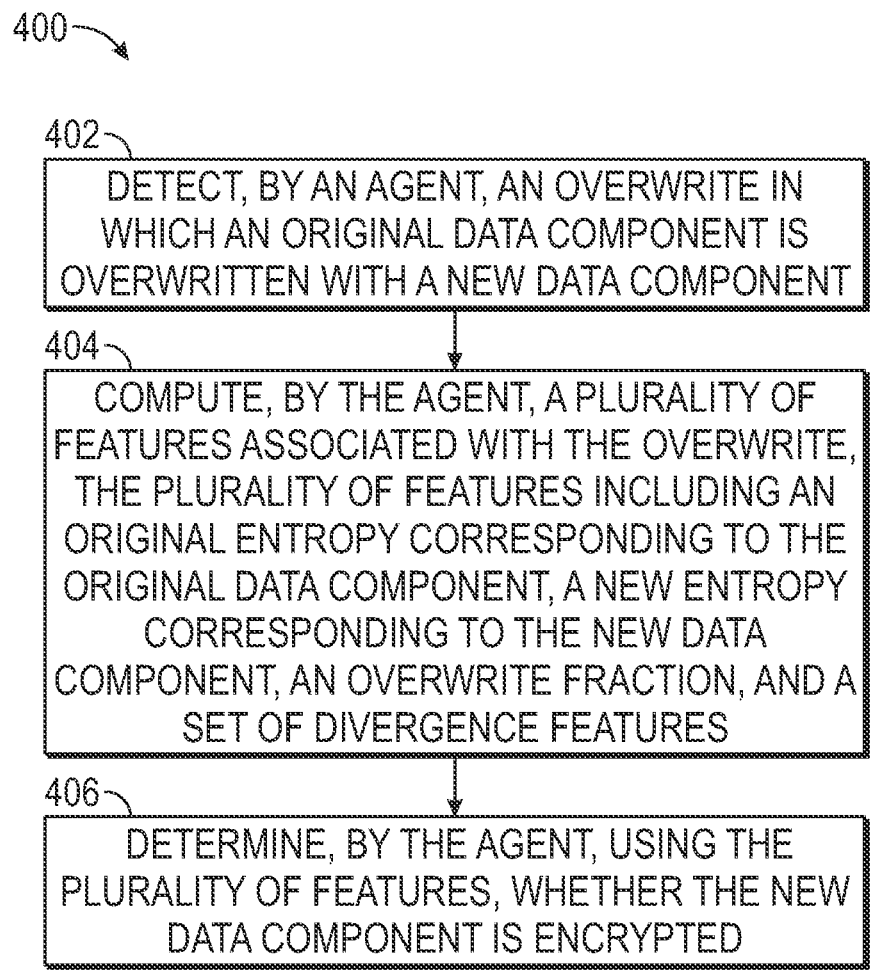
FIG. 4 is a flow diagram of a process for detecting a potential malware attack in accordance with one or more example embodiments.

FIG. 4 is a flow diagram of a process 400 for detecting a potential malware attack in accordance with one or more example embodiments. The process 400 may be implemented by one or more processors of a data storage apparatus, such as one of the data storage apparatuses 202(1)-202(n) described in connection with FIG. 2 executing computer-readable instructions from one or more computer-readable media to perform the functions described herein. In one or more examples, the process 400 may be implemented by one or more processes of a storage node, such as the storage node 304 described in connection with FIG. 3, executing computer-readable instructions from one or more computer-readable media to perform the functions described herein. For example, the process 400 may be implemented using the agent 300 and classification engine 324 described in connection with FIG. 3. It is understood that additional actions or operations can be provided before, during, and after the actions or operations of the process 400, and that some of the actions or operations described can be replaced or eliminated in other embodiments of the process 400.

The process 400 may begin by detecting, by an agent implemented in an operating system, an overwrite in which an original data component is overwritten with a new data component (operation 402). The original data component may be a file, a data block, or some other type of data component that is being overwritten. The overwrite may replace any number of bytes of the original data component with new data to form the new data component.

The process 400 then computes a plurality of features associated with the overwrite, the plurality of features including an original entropy corresponding to the original data component, a new entropy corresponding to the new data component, an overwrite fraction, and a set of divergence features (operation 404). As described earlier, the entropy corresponding to a data component provides information about the uncertainty or randomness of the data in that data component. In these examples, random data is an indicator of encryption, which is an indication of a potential malware attack.

In one or more examples, the original entropy and the new entropy are Shannon entropies and may be computed using, for example, formulas (1) and (2) described above. The overwrite fraction is the fraction or percentage of the original data component that is overwritten by the new data component. For example, the new data component may overwrite between about 5% and about 100% of the original data component (e.g., about 5% or about 100% of the bytes that make up the original data component). In one or more examples, the set of divergence features is based on KL divergence, as described above.

A determination is made, using the plurality of features, as to whether the new data component is encrypted (operation 406). Operation 406 may be performed using a linear SVM. A determination that the new data component is encrypted is an indication that the overwrite is associated with a malware attack risk (i.e., a malware attack is potentially underway). In one or more examples, a determination that the new data component is encrypted correlates with a malware attack with nearly 100% accuracy.

Figure 5:
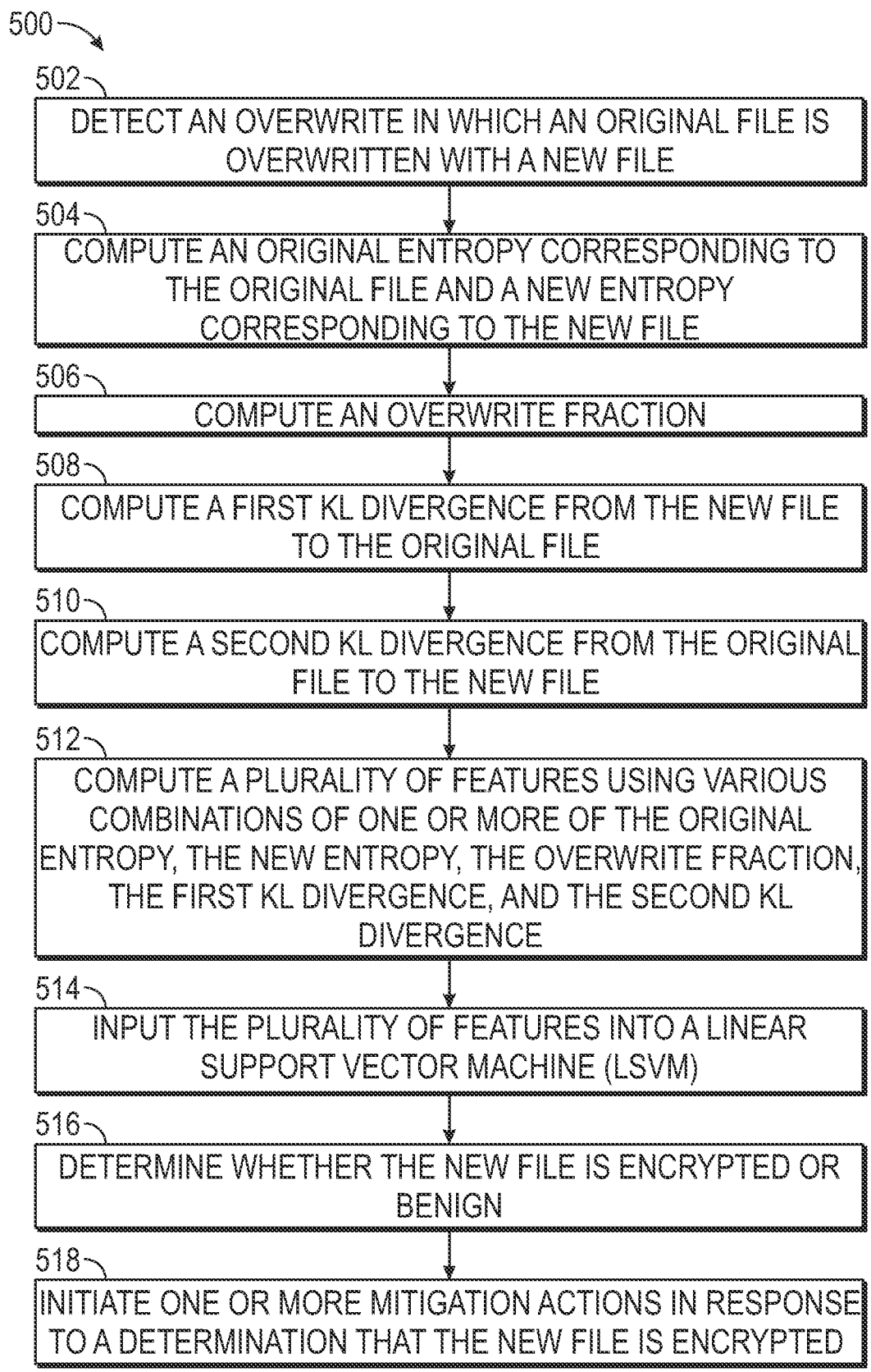
FIG. 5 is a is a flow diagram of a process for detecting a potential malware attack in accordance with one or more example embodiments.

FIG. 5 is a flow diagram of a process 500 for detecting a potential malware attack in accordance with one or more example embodiments. The process 500 may be implemented by one or more processors of a data storage apparatus, such as one of the data storage apparatuses 202(1)-202(n) described in connection with FIG. 2 executing computer-readable instructions from one or more computer-readable media to perform the functions described herein. In one or more examples, the process 500 may be implemented by one or more processes of a storage node, such as the storage node 304 described in connection with FIG. 3, executing computer-readable instructions from one or more computer-readable media to perform the functions described herein. For example, the process 500 may be implemented using the agent 300 and classification engine 324 described in connection with FIG. 3. It is understood that additional actions or operations can be provided before, during, and after the actions or operations of the process 500, and that some of the actions or operations described can be replaced or eliminated in other embodiments of the process 500.

The process 500 may begin by detecting an overwrite in which an original file is overwritten with a new file (operation 502). Although the process 500 is described with respect to a file, this process 500 may be implemented in a similar manner for some other type of data component.

An original entropy corresponding to the original file is computed and a new entropy corresponding to the new file are computed (operation 504). An overwrite fraction is computed (operation 506). A first KL divergence from the new file to the original file is computed (operation 508). A second KL divergence from the original file to the new file is computed (operation 510). A plurality of features is computed using various combinations of one or more of the original entropy, the new entropy, the overwrite fraction, the first KL divergence, and the second KL divergence (operation 512). For example, in addition to the original entropy, the new entropy, and the overwrite fraction, divergence features such as those computed via formulas (4)-(8) described above may be computed.

The plurality of features is input into an LSVM (operation 514). The LSVM determines whether the new file is encrypted or benign (operation 516). One or more mitigation actions are initiated in response to a determination that the new file is encrypted (operation 518). The one or more mitigation actions may include, for example, but is not limited to, preventing the new file from being written to disk, halting any further write actions, restoring the original file, some other type of mitigation action, or a combination thereof.

The LSVM discussed in process 500 may have been trained using a process similar to process 500 based on malware-encrypted sample files and benign sample files. Benign sample files may include one or more of, for example, without limitation, JAVA files, ZIP files, other types of compressed files, etc. The LSVM may be trained to provide about or near 100% accuracy with respect to detecting malware-based encryption.

Figure 6:
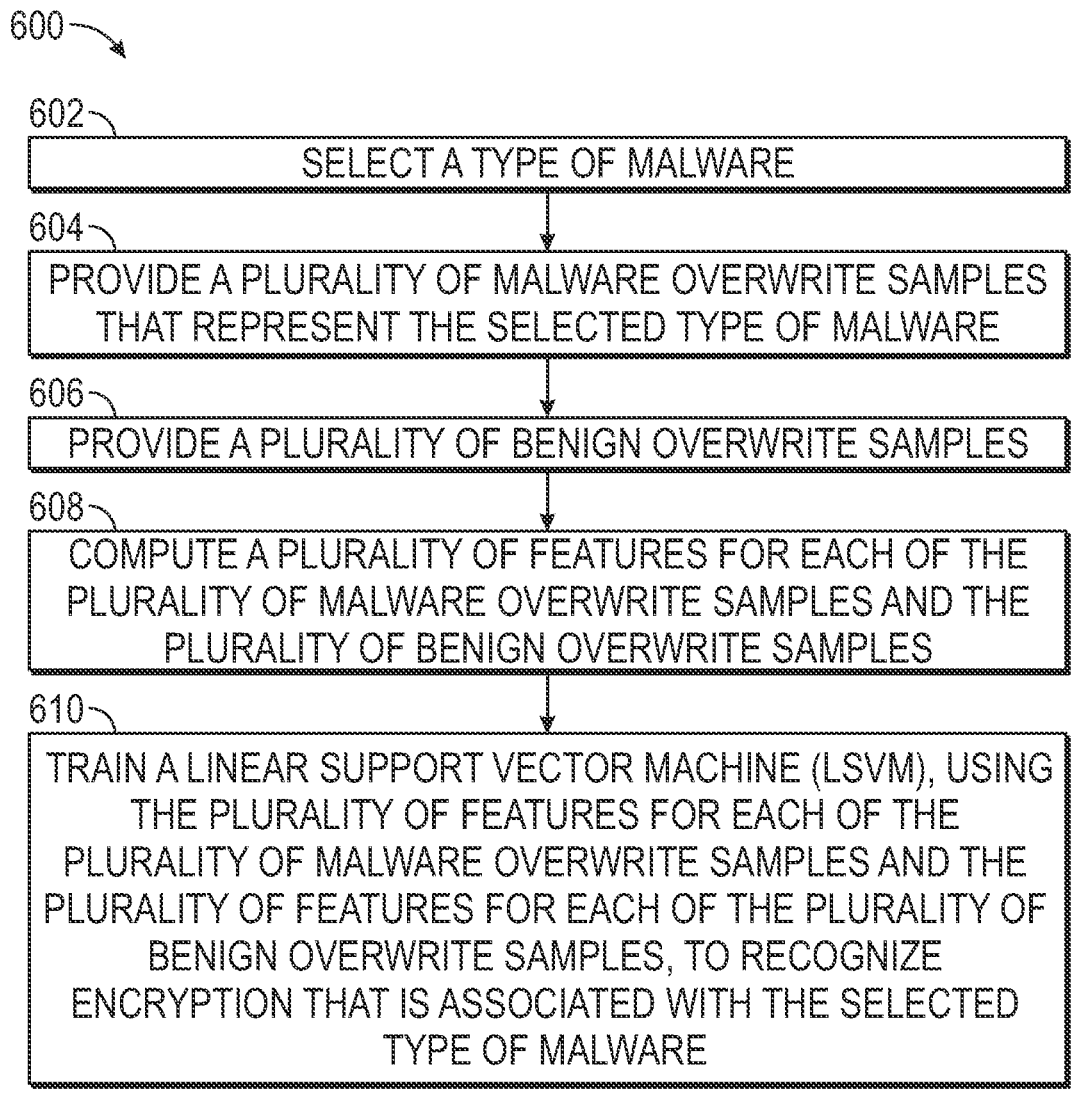
FIG. 6 is a flow diagram of a process for training a linear Support Vector Machine in accordance with one or more example embodiments.

FIG. 6 is a flow diagram of a process 600 for training an LSVM in accordance with one or more example embodiments. The process 600 may be implemented by one or more processors of a data storage apparatus, such as one of the data storage apparatuses 202(1)-202(n) described in connection with FIG. 2 executing computer-readable instructions from one or more computer-readable media to perform the functions described herein. In one or more examples, the process 600 may be implemented by one or more processes of a storage node, such as the storage node 304 described in connection with FIG. 3, executing computer-readable instructions from one or more computer-readable media to perform the functions described herein. For example, the process 600 may be implemented using the agent 300 and classification engine 324 described in connection with FIG. 3. It is understood that additional actions or operations can be provided before, during, and after the actions or operations of the process 600, and that some of the actions or operations described can be replaced or eliminated in other embodiments of the process 600.

The process 600 may begin by selecting a type of malware (operation 602). Thereafter, a plurality of malware overwrite samples that represent the selected type of malware are provided (operation 604). In operation 604, the plurality of malware overwrite samples may include varying percentages of overwrites. For example, the plurality of malware overwrite samples may include a 1% overwrite, a 5% overwrite, a 20% overwrite, etc. In some examples, the plurality of malware overwrite samples may include 21 overwrites ranging between a 1% and a 100% overwrite. The plurality of malware overwrite samples may be generated using the type of malware selected. Each of the plurality of malware overwrite samples includes an original data component and a new data component that overwrites the original data component.

Thereafter, a plurality of benign overwrite samples is provided (operation 606). In some cases, operation 606 includes generating the plurality of benign overwrite samples using authorized or trusted software. Each of the plurality of benign overwrite samples includes an original data component and a new data component that overwrites the original data component.

A plurality of features is computed for each of the plurality of malware overwrite samples and each of the plurality of benign overwrite samples (operation 608). This plurality of features may include, for example, eight features, each of which is or is computed using one or more of an original entropy corresponding to the original data component of that particular sample, a new entropy corresponding to the new data component of the particular sample, an overwrite fraction for the sample, a first KL divergence from the new data component to the original data component, and a second KL divergence from the original data component to the new data component.

An LSVM is trained, using the plurality of features for each of the plurality of malware overwrite samples and the plurality of features for each of the plurality of benign overwrite samples, to recognize encryption that is associated with the selected type of malware (operation 610). Thus, a classification as "encrypted" by the LSVM is an indication of a malware attack. The process 600 described above may be repeated for different types of malware to train the LSVM to recognize the different types of encryption associated with different types of malware.

As a result of the elements discussed above, examples of the present disclosure improve the detection of malware attacks, such as ransomware attacks, and improve data loss mitigation. The methods, systems, and machine-readable media described above provide techniques for distinguishing incoming data as encrypted versus benign, wherein encrypted data indicates a potential malware attack.

The present embodiments can take the form of an entirely hardware embodiment, an entirely software embodiment, or an embodiment containing both hardware and software elements. Accordingly, it is understood that any operation of the computing systems of the computing environment 100, the network environment 200, and the storage node 304 may be implemented by a computing system using corresponding instructions stored on or in a non-transitory computer-readable medium accessible by a processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    detecting, by an agent implemented in a data write path for an operating system, an overwrite command in which an original data component is to be overwritten with a new data component;
    computing, by the agent, a plurality of features associated with the overwrite command including an original entropy corresponding to the original data component, a new entropy corresponding to the new data component, an overwrite fraction that indicates a number of bytes of the original data component that have been replaced, and a divergence feature computed based on one or more mathematical combinations including (i) at least one relative entropy value computed as a difference in probability distribution between the new data component and the original data component, and (ii) at least the overwrite fraction;

inputting, by the agent, the plurality of features into a classification engine to determine whether the new data component is malicious or benign; and performing, by the agent in response to determining that the new data component is malicious, a mitigation action.

2. The method of claim 1, wherein the classification engine comprises an artificial intelligence algorithm, the method further comprising:

classifying, using the artificial intelligence algorithm, the new data component as encrypted; and determining, by the agent, the new data component is malicious in response to the classification as encrypted.

3. The method of claim 1, wherein the computing the at least one relative entropy value comprises:

computing, by the agent, a Kullback-Leibler divergence from the new data component to the original data component.

4. The method of claim 1, wherein the at least one relative entropy value computing comprises:

computing, by the agent, a Kullback-Leibler divergence from the original data component to the new data component.

5. The method of claim 1, wherein the divergence feature comprises a set of divergence features, and the computing the at least one relative entropy value comprises:

computing, by the agent, a first relative entropy value comprising a first Kullback-Leibler divergence from the new data component to the original data component, and a second relative entropy value comprising a second Kullback-Leibler divergence from the original data component to the new data component.

6. The method of claim 1, wherein the mitigation action comprises at least one of preventing the new data component being written to disk, restoring the original data component, or halting any further overwrite operations.

7. The method of claim 1, further comprising:

training the classification engine based on a first plurality of features for each of a plurality of malware overwrite samples, and a second plurality of features for each of a plurality of benign overwrite samples.

8. A non-transitory machine-readable medium having stored thereon instructions for performing a method comprising machine-executable code which, when executed by at least one machine, causes the at least one machine to:

compute a plurality of features associated with an overwrite command to replace an original data component with a new data component, the plurality of features including an original entropy corresponding to the original data component, a new entropy corresponding to the new data component, an overwrite fraction that indicates a number of bytes of the original data component that have been replaced, and a divergence feature computed based on one or more mathematical combinations including (i) at least one relative entropy value computed as a difference in probability distribution between the new data component and the original data component, and (ii) at least the overwrite fraction;

determine that the new data component is encrypted based on a classification engine's analysis of the plurality of features; and perform a mitigation action in response to the determination that the new data component is encrypted.

9. The non-transitory machine-readable medium of claim 8, wherein the machine-executable code further causes the at least one machine, as part of the computing the at least one relative entropy value, to:

compute a Kullback-Leibler divergence from the new data component to the original data component.

10. The non-transitory machine-readable medium of claim 8, wherein the divergence feature comprises a set of divergence features, and the machine-executable code further causes the at least one machine, as part of the computing the at least one relative entropy value, to:

compute a first relative entropy value comprising a first Kullback-Leibler divergence from the new data component to the original data component, and a second relative entropy value comprising a second Kullback-Leibler divergence from the original data component to the new data component.

11. The non-transitory machine-readable medium of claim 8, wherein the divergence feature comprises a set of divergence features, and the machine-executable code further causes the at least one machine, as part of the computing, to:

compute the set of divergence features including:

$$D_{KL}(P\|Q)/\lambda,$$

$$D_{KL}(Q\|P)/\lambda;$$

$$(D_{KL}(P\|Q)+D_{KL}(Q\|P))/\lambda;$$

$$(D_{KL}(P\|Q)+D_{KL}(Q\|P))*|(e(P)+e(Q)|/\lambda; \text{ and}$$

$$(D_{KL}(P\|Q)+D_{KL}(Q\|P))*|e(Q)-e(P)|/\lambda,$$

Wherein e(P) is the original entropy; e(Q) is the new entropy; $\lambda$ is the overwrite fraction; $D_{KL}(P\|Q)$ is a first Kullback-Leibler divergence from the new data component to the original data component; and $D_{KL}(Q\|P)$ is a second Kullback-Leibler divergence from the original data component to the new data component.

12. The non-transitory machine-readable medium of claim 8, wherein the machine-executable code further causes the at least one machine to:

detect, in a data write path for an operating system implemented on the at least one machine, the overwrite command before the new data component overwrites the original data component.

13. The non-transitory machine-readable medium of claim 8, wherein the mitigation action comprises at least one of preventing the new data component being written to disk, restoring the original data component, or halting any further overwrite operations.

14. The non-transitory machine-readable medium of claim 8, wherein the machine-executable code further causes the at least one machine to:

train the classification engine based on a first plurality of features for each of a plurality of malware overwrite samples, and a second plurality of features for each of a plurality of benign overwrite samples.

15. A computing device comprising:

at least one memory containing machine-readable medium comprising machine-executable code having stored thereon instructions for performing a method of managing a parallel file system during input/output (I/O) operation; and at least one processor coupled to the at least one memory, the at least one processor configured to execute the machine-executable code to cause the at least one processor to:

compute an original entropy corresponding to an original data component, a new entropy corresponding to a new data component associated with an overwrite command to replace the original data component, an overwrite fraction that indicates a number of bytes of the original data component that have been replaced, and a divergence feature computed based on one or more mathematical combinations including (i) at least one relative entropy value computed as a difference in probability distribution between the new data component and the original data component, and (ii) at least the overwrite fraction;

determine that the new data component is encrypted using the original entropy, the new entropy, the overwrite fraction, and the divergence feature; and implement a mitigation action in response to the determination that the new data component is encrypted.

16. The computing device of claim 15, wherein the original entropy and the new entropy are Shannon entropies, and the overwrite fraction comprises a fraction of a number of bytes of the original data component that are overwritten relative to a total number of bytes of the original data component.

17. The computing device of claim 15, wherein the divergence feature comprises a set of divergence features, and the at least one processor is configured to execute the machine-executable code to:

compute a first relative entropy value comprising a first Kullback-Leibler divergence from the new data component to the original data component, and a second relative entropy value a second Kullback-Leibler divergence from the original data component to the new data component.

18. The computing device of claim 15, wherein the divergence feature comprises a set of divergence features, and the at least one processor is configured to execute the machine-executable code to:

compute the set of divergence features including:

$D_{KL}(P\|Q)/\lambda$, $D_{KL}(Q\|P)/\lambda$;

$(D_{KL}(P\|Q)+D_{KL}(Q\|P))/\lambda$;

$(D_{KL}(P\|Q)+D_{KL}(Q\|P))*|(e(P)+e(Q)|/\lambda$; and $(D_{KL}(P\|Q)+D_{KL}(Q\|P))*|e(Q)-e(P)|/\lambda$;

wherein $e(P)$ is the original entropy; $e(Q)$ is the new entropy; $\lambda$ is the overwrite fraction; $D_{KL}(P\|Q)$ is a first Kullback-Leibler divergence from the new data component to the original data component; and $D_{KL}(Q\|P)$ is a second Kullback-Leibler divergence from the original data component to the new data component.

19. The computing device of claim 15, wherein the mitigation action comprises at least one of preventing the new data component being written to disk, restoring the original data component, or halting any further overwrite operations.

20. The computing device of claim 15, wherein the at least one processor is configured to execute the machine-executable code to:

train a classification engine based on a first plurality of features for each of a plurality of malware overwrite samples, and a second plurality of features for each of a plurality of benign overwrite samples; and use the classification engine to determine that the new data component is encrypted based on the original entropy, the new entropy, the overwrite fraction, and the divergence feature.

* * * * *